United States Patent [19]
Allmon et al.

[11] Patent Number: 5,257,903
[45] Date of Patent: Nov. 2, 1993

[54] LOW PRESSURE DROP RADIAL INFLOW AIR-OIL SEPARATING ARRANGEMENT AND SEPARATOR EMPLOYED THEREIN

[75] Inventors: Barry L. Allmon, Maineville; Kevin B. Tongeman, Cincinnati, both of Ohio

[73] Assignee: General Electric Company, Cincinnati, Ohio

[21] Appl. No.: 960,023

[22] Filed: Oct. 13, 1992

Related U.S. Application Data

[62] Division of Ser. No. 784,847, Oct. 30, 1991.

[51] Int. Cl.$^5$ .............................................. F01D 25/32
[52] U.S. Cl. .......................... 415/169.1; 60/39.08; 55/406; 184/6.23; 416/223 B
[58] Field of Search ............... 415/169.1, 169.2, 169.3, 415/169.4; 184/6.23; 60/39.08; 55/406; 416/223 R, 223 B, 181

[56] References Cited

U.S. PATENT DOCUMENTS

| | | | |
|---|---|---|---|
| 3,378,104 | 4/1968 | Venable | 184/6.12 |
| 3,785,128 | 1/1974 | Redemann | 415/169.2 |
| 3,932,063 | 1/1976 | Butler | 55/406 |
| 4,268,281 | 5/1981 | Erickson | 55/408 |
| 4,416,586 | 11/1983 | Diederich et al. | 415/169.1 |
| 4,548,545 | 10/1985 | Lewis et al. | 415/169.1 |
| 4,815,930 | 3/1989 | Hutchison | 415/169.2 |
| 4,840,645 | 6/1989 | Woodworth et al. | 55/406 |
| 4,921,400 | 5/1990 | Niskanen | 415/169.1 |
| 5,000,769 | 3/1991 | Raguideau et al. | 55/406 |

FOREIGN PATENT DOCUMENTS 29800 2/1984 Japan ..................... 415/169.2

*Primary Examiner*—John T. Kwon
*Attorney, Agent, or Firm*—Jerome C. Squillaro

[57] ABSTRACT

An air-oil separating arrangement in a gas turbine engine having a sump with a rotatable annular wall structure includes an annular section of the sump wall structure having a plurality of circumferentially spaced air metering orifices defined therein, and an air-oil separator having a circular plate attached to the annular section of the sump wall structure and rotatable therewith. The circular plate has a pair of opposite faces and a plurality of separator fins attached to and extending from one face of the plate. The separator fins are circumferentially spaced from one another and extend radially from the center of the plate and define spaces therebetween which are in flow communication with the orifices through the annular section of the sump wall structure. The engine also includes a center vent passage aligned with the center of the separator plate such that when oil particle-laden pressurized air flows from the sump through the metering orifices and radially inwardly through the radial spaces between the separator fins into the center vent passage, the oil particles carried by the air will be impacted by the fins and centrifugally ejected in an outward radial direction back outwardly through the metering orifices and thereby separated from the air flow through the separator and returned to the sump.

7 Claims, 3 Drawing Sheets

LOW PRESSURE DROP RADIAL INFLOW AIR-OIL SEPARATING ARRANGEMENT AND SEPARATOR EMPLOYED THEREIN

This is a division of application Ser. No. 07/784,847 filed Oct. 30, 1991.

BACKGROUND OF THE INVENTION

1. Field of the Invention

The present invention relates generally to gas turbine engines and, more particularly, to a lower pressure drop radial inflow air-oil separating arrangement in the engine and an air-oil separator employed in the arrangement.

2. Description of the Prior Art

Gas turbine engines typically include a core engine having a compressor for compressing air entering the core engine, a combustor where fuel is mixed with the compressed air and then burned to create a high energy gas stream, and a first or high pressure turbine which extracts energy from the gas stream to drive the compressor. In aircraft turbofan engines, a second turbine or low pressure turbine located downstream from the core engine extracts more energy from the gas stream for driving a fan. The fan provides the main propulsive thrust generated by the engine.

Bearings are used in the engine to accurately locate and rotatably mount rotors with respect to stators in the compressor and high and low pressure turbines of the engine. The temperature capability of the bearings is, however, quite limited compared to the temperatures of many areas of the engine flowpath through the compressor, combustor and high and low pressure turbines, which flowpath areas are located in close proximity to the bearing. For example, bearings can operate up to 600° F., whereas compressor exit temperature often exceeds 1100° F. and turbine inlet temperature often exceeds 2000° F.

In order to prevent overheating of the bearings, lubricating oil and seals must be provided to prevent the hot air in the engine flowpath from reaching the bearing sumps, and lubricating oil flows must be sufficient to carry away heat generated internally by the bearings because of their high relative speed of rotation. Non-contacting or labyrinth seals are one type of seals that are employed at the sites of many bearings. A labyrinth seal includes one or more pointed teeth usually mounted on a rotating seal member and running in close proximity to a cylindrical or stepped cylindrical stationary stator with air or gas flow between the two members.

Labyrinth seals require air pressurization to prevent leaking of oil through the seals. Pressurization of the seals, in turn, pressurizes the oil sump. However, the sump pressure must be maintained at a proper balance for the lubricating system to function properly. On the one hand, if the sump is over-pressurized, oil will be forced out through the oil seals. On the other hand, if the sump is under-pressurized, the performance of the oil pump of the lubricating system will be adversely affected.

The pressurized air must be vented from the sump in a controlled manner in order to maintain sump pressure at the proper balance. However, the pressurized air is mixed with particles of the oil in the sump. Therefore, the oil must be separated from the air before venting of the air in order to minimize the amount of oil carried overboard by the venting air. An air-oil separator device is typically employed between the oil sump and a center vent passage through the inner drive shaft of the engine to achieve the desired separation. Air-oil separator devices utilized heretofore have several shortcomings which adversely affect seal effectiveness and oil consumption.

One prior art air-oil separator device employs a concentric arrangement of cylindrical plates having staggered air holes which define a tortuous path for the flow of air through the apparatus. This separator device produces a large pressure drop which contributes to the sump pressure being too high and causes oil to backflow the sump labyrinth seals. One reason for the high pressure drop is the free vortex flow of the air once it exits the separator device and travels to the center vent passage. Another reason for the high pressure drop is that the tortuous path of air flow through the separator devices produces a non-determinable pressure drop which cannot be controlled.

Another prior art air-oil separator device employs a series of aligned air flow orifices of different diameters which makes it impossible to predict the pressure drop across the device and thus to determine the efficiency of the separator device. Also, the air flow has a higher pressure drop due to combined forced and free vortex flow.

Consequently, a need exists for improvement of air-oil separation in a manner that will increase separator efficiency and improve sump pressure control.

SUMMARY OF THE INVENTION

The present invention provides an air-oil separator and separating arrangement designed to satisfy the aforementioned need. The air-oil separating arrangement of the present invention provides radial inflow of the air-oil mixture and produces a low pressure drop between the oil sump and center vent passage of the engine in such manner that separator efficiency is substantially uncoupled from sump pressure control.

Accordingly, the present invention is directed to an air-oil separator for an air-oil separating arrangement in a gas turbine engine. The air-oil separator comprises a circular plate having a center and a pair of opposite faces, and a plurality of separator fins attached to and extending from one of the opposite faces of the plate. The separator fins are spaced circumferentially from one another and extend radially from the center of the plate. The separator further comprises a removal hub connected to the center of the plate and extending outwardly from the one face of the plate. The separator fins have generally planar configurations and extend substantially perpendicular to the one face of the plate. The separator fins also have opposite outer and inner edges. The inner edges are radially spaced from one another and also spaced from the hub of the plate.

The present invention is also directed to an air-oil separating arrangement in a gas turbine engine having a sump with a rotatable annular wall structure. The air-oil separating arrangement comprises an annular section of the sump wall structure having a plurality of circumferentially spaced air metering orifices defined therein, and an air-oil separator as defined above. The circular plate of the separator is attached to the annular section of the sump wall structure such that the separator is rotatable therewith. The separator fins of the separator being spaced circumferentially from one another and extending radially from the hub of the plate define spaces therebetween which are in flow communication with the metering orifices through the annular section of the sump wall structure.

The engine also includes a center vent passage aligned with the center hub of separator plate. The center vent passage is vented to ambient to establish a lower air pressure in the center vent passage than in the sump such that oil particle-laden pressurized air in the sump will flow from the sump through the metering orifices radially inwardly toward the center of the separator plate through the radial spaces between the separator fins and therefrom into the center vent passage. As the oil particles carried by the air traverse through the radial spaces between the separator fins, they will be impacted by the separator fins of the rotatable separator and centrifugally ejected in an outward radial direction back outwardly through the metering orifices and thereby separated from the air flow through the separator and returned to the sump.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
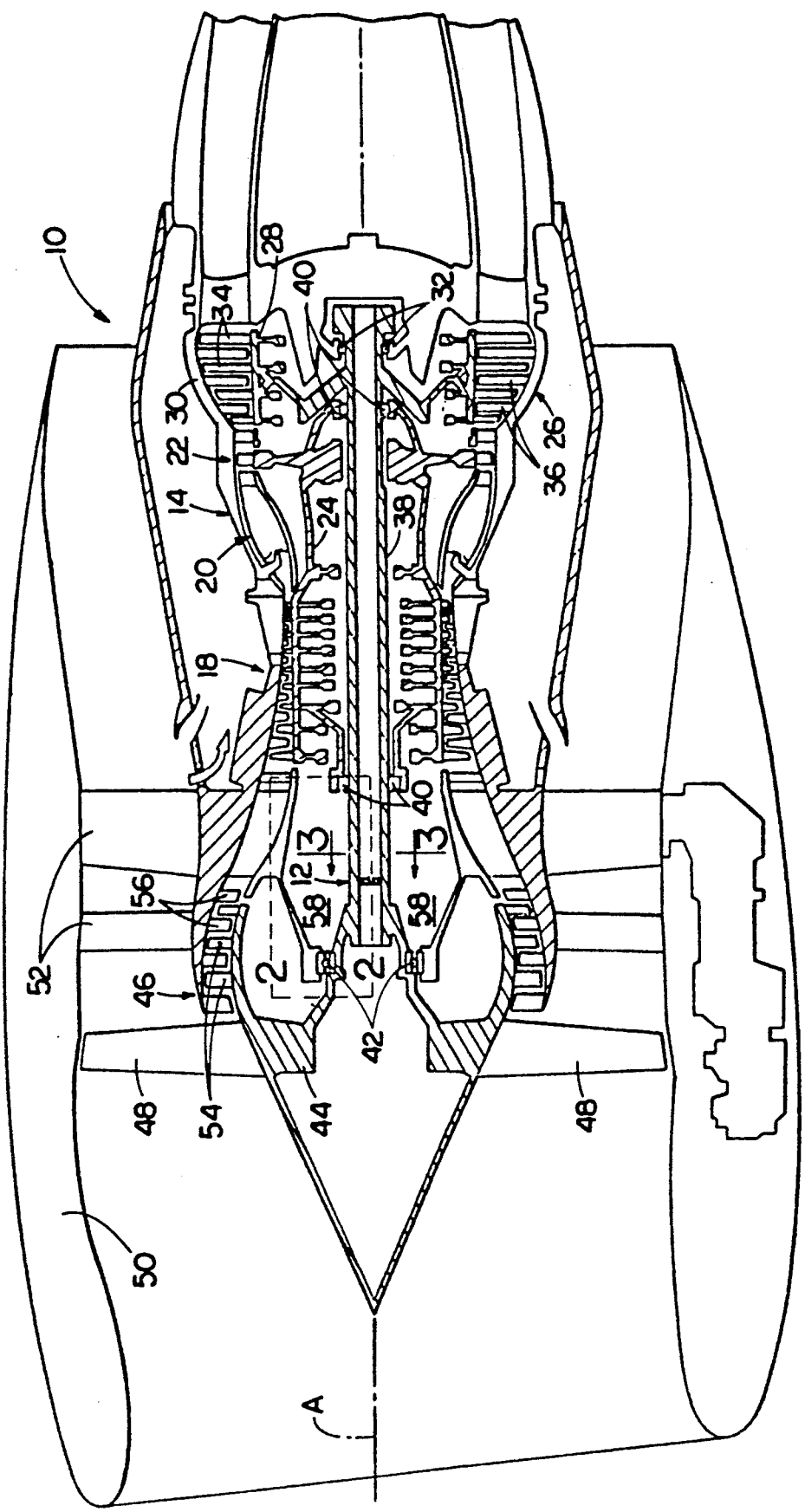
FIG. 1 is a longitudinal axial sectional view of a gas turbine engine incorporating an air-oil separating arrangement of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Gas Turbine Engine

Figure 2:
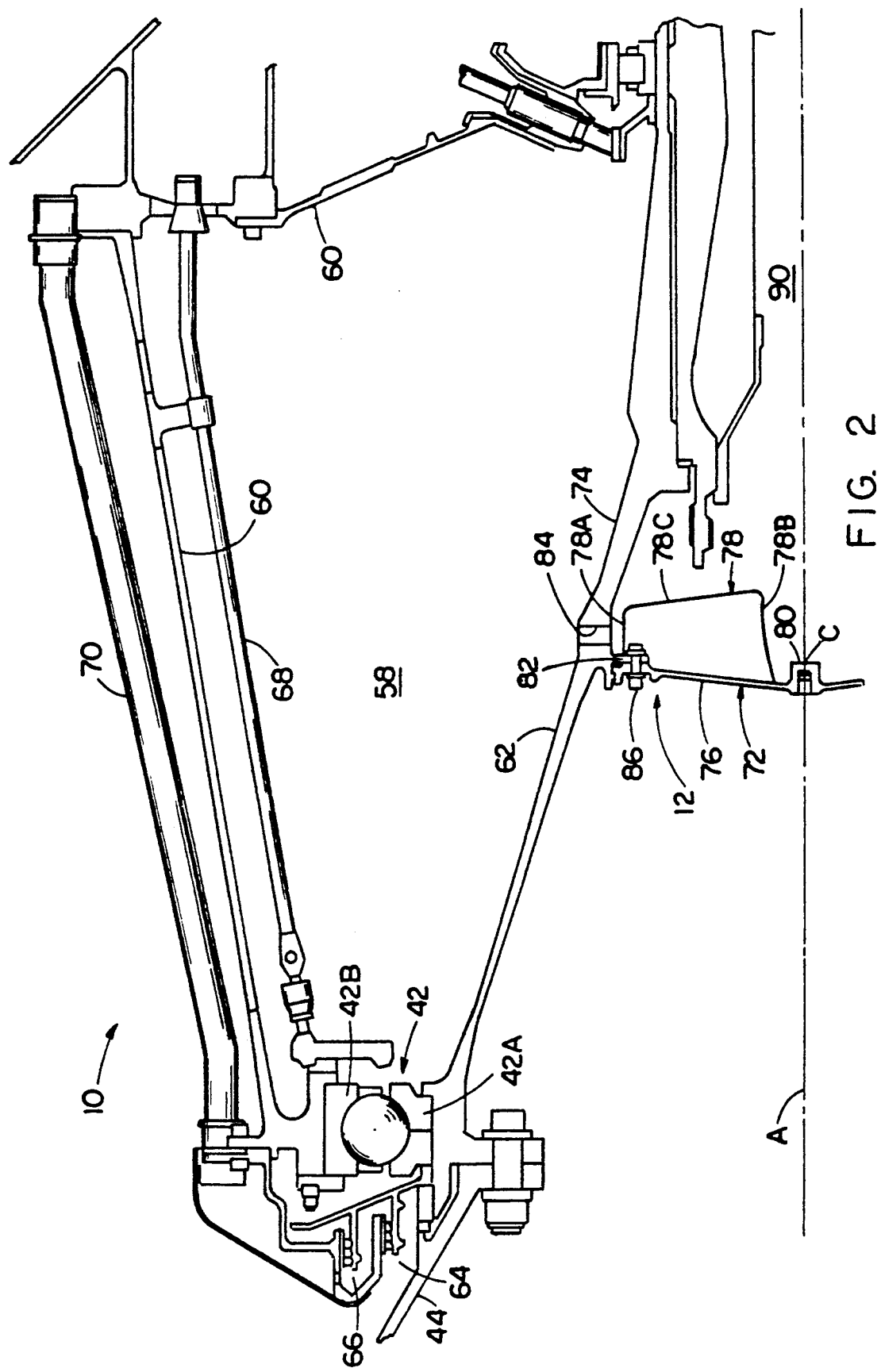
FIG. 2 is an enlarged fragmentary view of a region of the engine enclosed by dashed box 2—2 of FIG. 1 incorporating a bearing sump and the air-oil separating arrangement of the present invention in communication with the sump.
Figure 3:
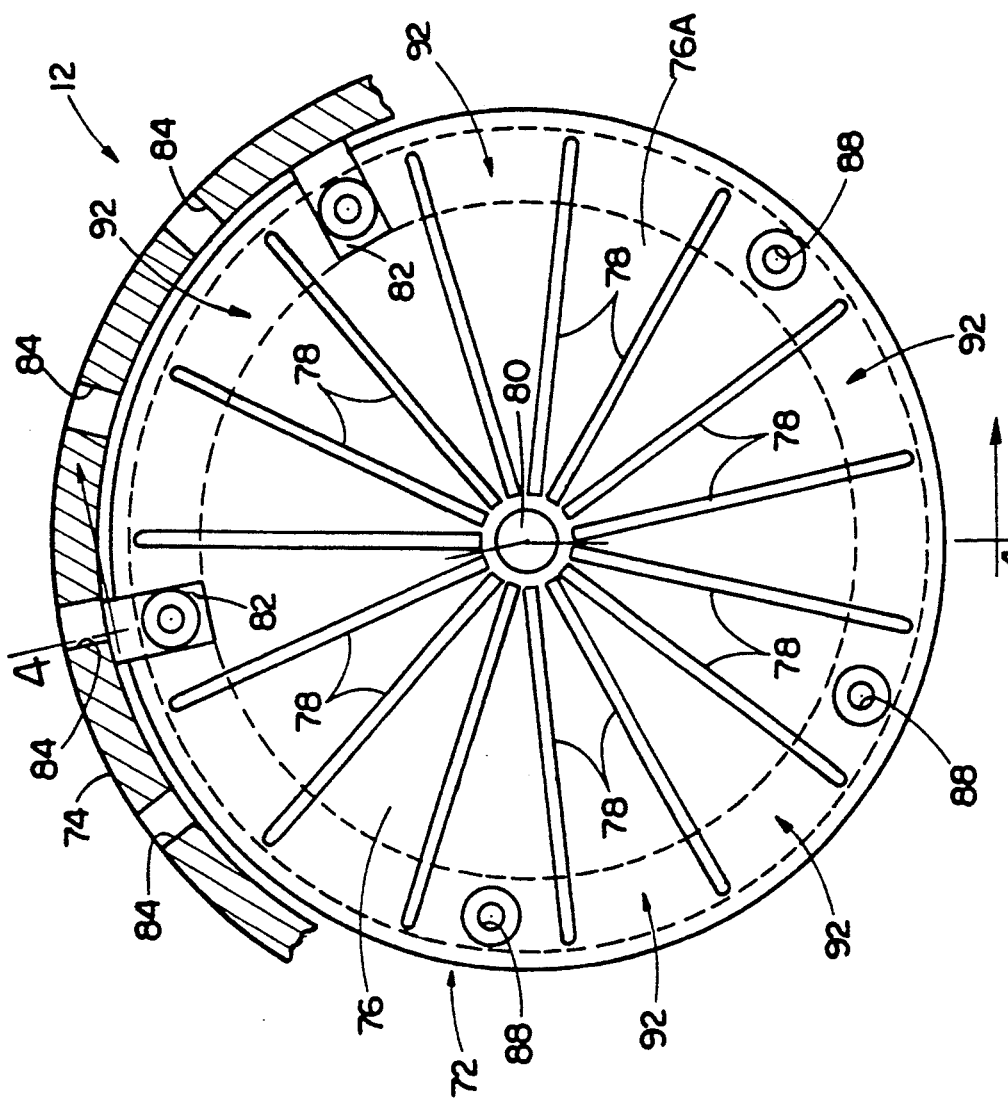
FIG. 3 is an enlarged front elevational view of the air-oil separating arrangement of the present invention as seen along line 3—3 of FIG. 1.
Figure 4:
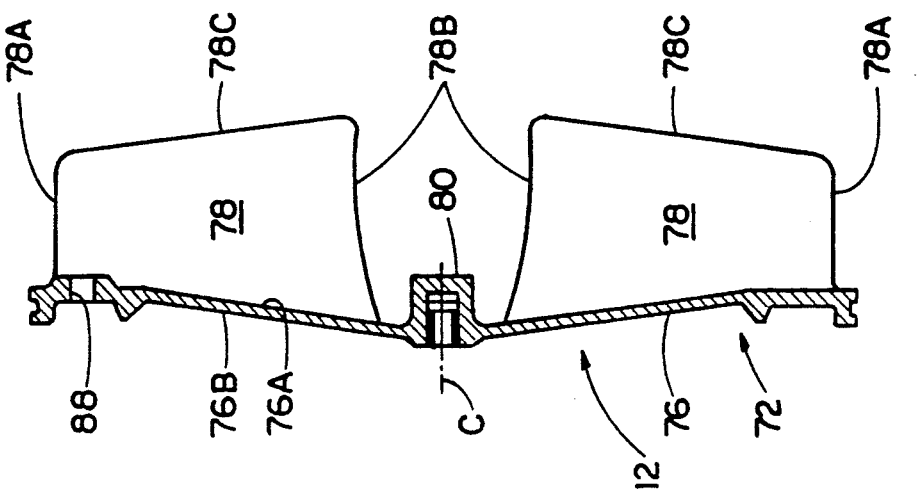
FIG. 4 is a radial sectional view of the air-oil separator of the separating arrangement taken along line 4—4 of FIG. 3.

Referring now to the drawings, and particularly to FIG. 1, there is illustrated a gas turbine engine, generally designated 10, in which is incorporated an air-oil separating arrangement 12 of the present invention, as shown in detail in FIGS. 2-4. The engine 10 has a longitudinal center line or axis A and an outer stationary annular casing 14 disposed concentrically about and coaxially along the axis A. The engine 10 includes a core gas generator engine 16 which is composed of a multi-stage compressor 18, a combustor 20, and a high pressure turbine 22, either single or multiple stage, all arranged coaxially about the longitudinal axis or center line A of the engine 10 in a serial, axial flow relationship. An annular outer drive shaft 24 fixedly interconnects the compressor 18 and high pressure turbine 22.

The core engine 16 is effective for generating combustion gases. Pressurized air from the compressor 18 is mixed with fuel in the combustor 20 and ignited, thereby generating combustion gases. Some work is extracted from these gases by the high pressure turbine 22 which drives the compressor 18. The remainder of the combustion gases are discharged from the core engine 16 into a low pressure power turbine 26.

The low pressure turbine 26 includes an annular drum rotor 28 and a stator 30. The rotor 28 is rotatably mounted by suitable rear bearings 32 and includes a plurality of turbine blade rows 34 extending radially outwardly therefrom and axially spaced. The stator 30 is disposed radially outwardly of the rotor 28 and has a plurality of stator vane rows 36 fixedly attached to and extending radially inwardly from the outer stationary casing 14. The stator vane rows 36 are axially spaced so as to alternate with the turbine blade rows 34. The rotor 28 is fixedly attached to an inner drive shaft 38 being mounted for rotation relative to the outer drive shaft 24 via differential bearings 40 and via suitable forward bearings 42 interconnected to the outer stationary casing 14.

The inner drive shaft 38, in turn, rotatably drives a forward fan disk/booster rotor 44 which forms part of a booster compressor 46. The rotor 44 also supports forward fan blades 48 that are housed within a nacelle 50 supported about the stationary outer casing 14 by a plurality of struts 52. The booster compressor 46 is comprised of a plurality of booster blade rows 54 fixedly attached to and extending radially outwardly from the booster rotor 44 for rotation therewith and a plurality of booster stator vane rows 56 fixedly attached to and extending radially inwardly from the stationary outer casing 14. Both the booster blade rows 54 and the stator vane rows 56 are axially spaced and so arranged to alternate with one another.

Air-Oil Separating Arrangement of Present Invention

Referring now to FIG. 2, there is illustrated the region of the gas turbine engine 10 where a conventional bearing sump 58 is defined about the forward bearings 42 of the inner drive shaft 38 and where the air-oil separating arrangement 12 of the present invention is located in communication with the bearing oil sump 58. The bearing sump 58 is generally defined by an outer annular structure 60 which is interconnected to the outer casing 14 and an inner annular structure 62 which rigidly interconnects the forward end of the inner drive shaft 38 to the forward fan disk/booster rotor 44. The inner annular structure 62 of the bearing sump 58 being connected with an inner annular race 42A of the forward bearings 42 rotates with the inner drive shaft 38 relative to the stationarily mounted outer annular structure 60 of the bearing sump 58 being connected to an outer annular race 42B of the forward bearings 42.

Conventional labyrinth air and oil seals 64, 66 are provided adjacent to the forward bearings 42 and between the forward ends of the relatively rotating outer and inner annular structures 60, 62 to seal the forward end of the bearing sump 58. Oil is pumped to the forward bearings 42 and therefore into the sump 58 through an oil supply conduit 68. Pressurized air is injected to the labyrinth air seal 64 through an air supply conduit 70 in order to prevent oil from leaking through the labyrinth oil seal 66.

A portion of the injected pressurized air which enters the bearing sump 58 must be vented from the sump in a controlled manner in order to maintain sump pressure at a proper balance. However, the pressurized air becomes mixed with particles of the oil in the sump 58. Therefore, the particles of oil must be separated from the air before venting of the air in order to minimize the amount of oil carried overboard by the venting air. The air-oil separating arrangement 12 of the present invention is provided in communication with the bearing sump 58 for this purpose.

Basically, the air-oil separating arrangement 12 is comprised of an air-oil separator 72 and an annular section 74 of the inner annular structure 62 of the bearing sump 58 as best seen in FIGS. 2 and 3. Now referring to FIGS. 2-4, the air-oil separator 72 includes a circular plate 76 having a center C and a pair of opposite faces 76A, 76B, a plurality of separator fins 78 attached to and extending from one of the opposite faces 76A of the plate 76, and a removal hub 80 connected to the center C of the plate 76 and extending outwardly from the one face 76A of the plate 76. The hub 80 is internally threaded and provides means for removing the separator 72 from the annular structure 62 after it has been detached. The separator fins 78 are spaced circumferentially from one another and extend radially from the center C of the plate 76. The separator fins 78 have generally planar configurations and extend substantially perpendicular from the one face 76A of the plate 76. The separator fins 78 also have opposite outer and inner edges 78A, 78B and are so positioned such that adjacent fins 78 converge from their outer edges 78A toward their inner edges 78B. The inner edges 78B are radially spaced from one another relative to the center C of the plate 76 and also spaced outwardly from the hub 80 of the plate 76. The outer and inner edges 78A, 78B of each separator fin 78 extend to a radial edge 78C which is located at a greater height or distance from the plate 76 at the inner edge 78B than at the outer edge 78A of the separator fin 78 so as to maintain a constant area.

As best seen in FIG. 3, the annular section 74 of the inner annular structure 62 of the bearing sump 58 includes a plurality of tabs 82 attached to the sump annular section 74 and extending radially inwardly a short distance therefrom and a plurality of circumferentially spaced air metering orifices 84 defined through the annular section 74. Bolts 86 (only shown in FIG. 2) are installed through aligned holes 88 in the tabs 82 and the peripheral portion of the plate 76 of the separator 72 to removably attach the separator 72 across a center vent passage 90 of the inner drive shaft 38. As best seen in FIG. 3, the metering orifices 84 are spaced from one another and are in flow communication with the narrow spaces 92 extending radially between the adjacent separator fins 78. Although the metering orifices 84 are shown as being aligned with the narrow spaces 92 extending between the adjacent separator fins 78, they need not be so aligned. Furthermore, the number of metering orifices 84 need not equal the number of spaces 92.

Since the center vent passage 90 is vented to the ambient environment, the air pressure is lower in the center vent passage 90 than in the bearing sump 58. Therefore, some of the oil particle-laden pressurized air in the sum 58 will flow through the annular row of metering orifices 84 radially inwardly toward the hub 80 of the separator 72 through the radial spaces 92 between the separator fins 78 of the separator 72 and therefrom into the center vent passage 90. However, the spacing of the separator fins 78 from one another is such that before a given oil particle carried by the air traverses the distance from the outer edge 78A to inner edge 78B of the fins 78 it will be impacted by the fin 78 and centrifugally ejected in an outward radial direction back outwardly through the metering orifice 84. In such manner, the oil particles are separated from the air flow through the separator 72 and returned to the bearing sump 58.

The advantages provided by the air-oil separating apparatus 12 are as follows: (1) a lower pressure drop separator for a given diameter due to totally forced vortex air flow and the separator fins extending down to the center vent passage diameter with no axial excursions producing minimum pressure losses; (2) a non-enclosed separator (no back cover plate) giving a lighter weight design, an internally inspectable part, and also a part that can be compression molded; (3) more predictable sump pressure due to standard orifice and forced vortex pressure losses which results in reduction in development time of components; and (4) uncoupling of sump pressure control and separator efficiency by making sump pressure mainly a function of the metering orifices and by making the separator efficiency mainly a function of the separator fins.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. In an air-oil separating arrangement for a gas turbine engine, an air-oil separator comprising:
    (a) a circular plate having a center and a pair of opposite faces; and
    (b) a plurality of separator fins attached to and extending from one of said opposite faces of said plate, said separator fins being spaced circumferentially from one another and extending radially from said center of said plate.

2. The separator as recited in claim 1, further comprising:
    (c) a hub connected to said center of said plate and extending outwardly from said one face of said plate.

3. The separator as recited in claim 2, wherein said fins have inner edges being spaced from one another and also from said hub of said plate.

4. The separator as recited in claim 1, wherein said separator fins have generally planar configurations and extend substantially perpendicular to said one face of said plate.

5. The separator as recited in claim 1, wherein said fins have inner edges being spaced from one another.

6. The separator as recited in claim 1, wherein each of said fins has a generally planar configuration and opposite outer and inner edges being radially spaced from one another relative to said center of said plate.

7. The separator as recited in claim 6, wherein said inner edge of said fin extends a greater height from said plate than does said outer edge of said fin.

* * * * *